United States Patent [19]

Young

[11] 4,317,590
[45] Mar. 2, 1982

[54] EXTENDABLE ROOF FOR RECREATIONAL VEHICLE

[76] Inventor: Jay M. Young, 1109 Carmen Ave., Holly Hill, Fla. 32017

[21] Appl. No.: 142,008

[22] Filed: Apr. 21, 1980

[51] Int. Cl.³ .............................. B60P 3/32; B60J 7/08
[52] U.S. Cl. ........................................................ 296/176
[58] Field of Search ................. 296/176, 165, 26, 164, 296/171, 27

[56] References Cited

U.S. PATENT DOCUMENTS

| | | | |
|---|---|---|---|
| 3,000,664 | 9/1961 | Martin | 296/26 |
| 3,053,562 | 7/1962 | Farber | 296/26 |
| 3,321,876 | 5/1967 | Birkenhouer | 296/27 |
| 3,323,778 | 6/1967 | Baker | 296/171 X |
| 3,377,100 | 4/1968 | Cripe | 296/176 |
| 3,582,130 | 6/1971 | Broskey | 296/176 |
| 3,924,889 | 12/1975 | Gogush | 296/176 |

Primary Examiner—David M. Mitchell

Attorney, Agent, or Firm—Bacon & Thomas

[57] ABSTRACT

The roof of a recreational vehicle is cut away to leave a large opening over the vehicle compartment and an upwardly extendable roof is mounted over the opening. The extendable roof has an upstanding wall fixed to the vehicle around the opening and an upper section has a roof panel with a depending wall receivable in the upstanding wall and having an outwardly extending flange at its lower edge. An intermediate wall section extends around both the depending and the upstanding walls and has upper and lower flanges engageable, respectively, with the flange on the upper section and another flange at the upper edge of the upstanding wall to limit upward movement of the upper section. The intermediate wall has releasably secured ends to permit spreading for assembling the sections of the roof. Swingable links control raising and lowering the roof and a shroud or fairing depends from the outer edge of the roof panel to enclose the wall sections when the roof is lowered.

11 Claims, 7 Drawing Figures

EXTENDABLE ROOF FOR RECREATIONAL VEHICLE

BACKGROUND OF THE INVENTION

This invention is in the field of raisable or liftable roofs for recreational vehicles to provide additional head room in the passenger compartment of the vehicle.

It has been proposed heretofore to provide roofs for recreational vehicles which can be lifted to provide additional head room within the vehicle when camping or the like. See, for example, the patent to Peterson et al. U.S. Pat. No. 3,212,813. In that patent, a roof structure is liftable and in so raising the same, side panels are swung upwardly or unfolded to provide additional sides extending upwardly from the vehicle to the raised roof. However, the structure described and shown in that patent involves fairly complicated manufacturing procedures, and results in a structure that is not completely weather tight. The patent to Borskey, U.S. Pat. No. 3,582,130 shows a liftable roof of rigid construction which, when lifted, extends canvass or other fabric sidewalls to provide sides thereof. The liftable roof is connected to the vehicle by crossed links pivoted at their intermediate portion, and each being slidable at its ends along the vehicle roof and the liftable roof. Such a structure, however, is not weatherproof and cannot be left in the raised position while traveling. The patent to Garrison, U.S. Pat. No. 3,463,541 discloses a liftable roof comprising rigid telescopically related sections, but the arrangement is such that the roof is considerably wider than the lower section, and thus the increased head room in the vehicle is not of maximum or most efficient width, and the sidewalls of the elevated portion taper downwardly and inwardly from the raised roof to the vehicle. Other patents of some pertinence to this invention are McKee, U.S. Pat. No. 3,802,732, Woods, U.S. Pat. No. 1,871,871, Orn et al. U.S. Pat. No. 3,145,046 and Cobb, U.S. Pat. No. 3,819,223. These additional patents, however, are subject to most of the same disadvantages pointed out with respect to the first three patents herein.

SUMMARY OF THE INVENTION

It is an object of this invention to provide an extendable roof for recreational vehicles to increase the head room in a vehicle compartment. Such an extendable roof is of rigid construction and when erected offers very little air resistance upon movement of the vehicle, and thus may be left in the erected position during travel.

A further object is to provide such a rigid extendable roof that is weatherproof when erected and able to withstand extreme weather conditions.

Another object is to provide an extendable roof structure for recreational vehicles that may be installed by the user on any conventional vehicle.

Another object is to provide an extendable roof structure for a vehicle that may be operated by manual means or by power means.

In general, the invention comprises an upper roof section in the form of a generally horizontal panel, having a depending wall telescopically receivable within a lower section having an upstanding wall, secured about an opening in the vehicle top. An intermediate section interengages with both the upper and lower sections to prevent separation and to limit the extent of raising of the upper section relative to the vehicle. When in its lowered position, the three sections telescope downwardly, and an outer shroud on the roof section extends down to the vehicle top to enclose all movable parts and protect the same from the weather. The operating mechanism comprises links pivoted adjacent the ends of the vehicle and connecting the lower and upper sections. The connection to the lower section being pivotal and on fixed axes. Links on opposite sides of the vehicle being interconnected to swing simultaneously and their upper ends being guided by trackways extending longitudinally on the upper section. Cable means interconnect the links at the opposite ends of the vehicle to ensure their simultaneous pivoting about their respective axis. The intermediate section is separable and spreadable so that flanges on its upper and lower edges may be assembled over corresponding flanges on the upper and lower sections.

DESCRIPTION OF A PREFERRED EMBODIMENT

Figure 1:
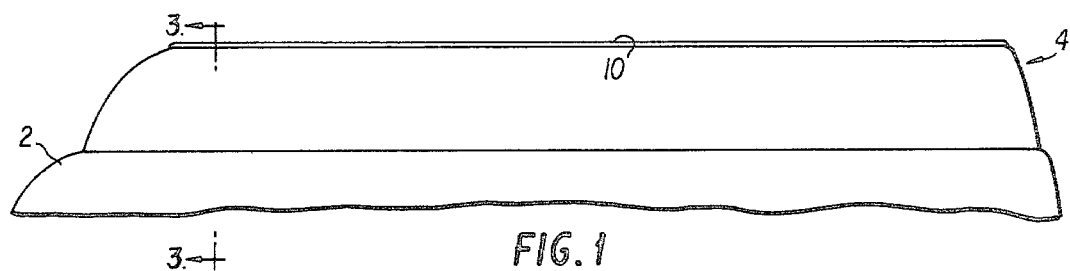
FIG. 1 is a fragmentary view of a vehicle having the present invention applied thereto, and with the extendable roof in its lower position.
Figure 2:
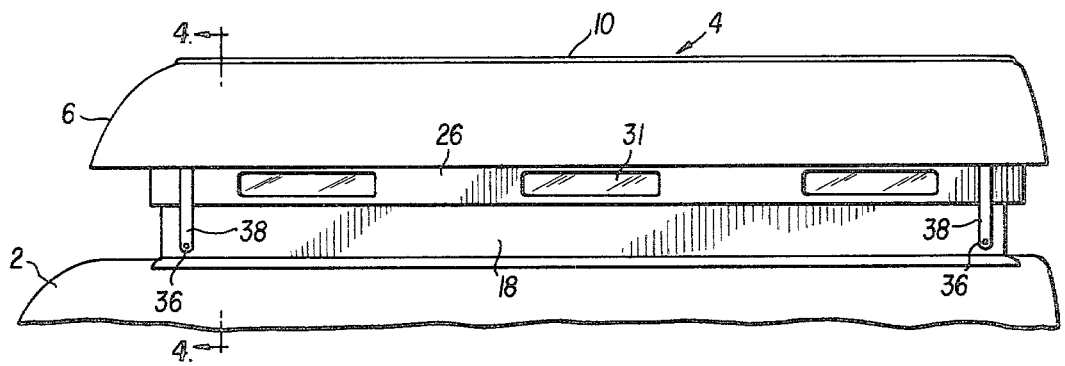
FIG. 2 is a view similar to FIG. 1, but showing the extendable roof in its upper or extended position.

In FIGS. 1 and 2, numeral 2 designates the upper portion of a recreational vehicle which may be a van or other similar vehicle, the front of the vehicle being at the left side of the Figures, and numeral 4 designates the upper section of a roof extendable to an upper position from the position of FIG. 1 to the position of FIG. 2.

Figure 3:
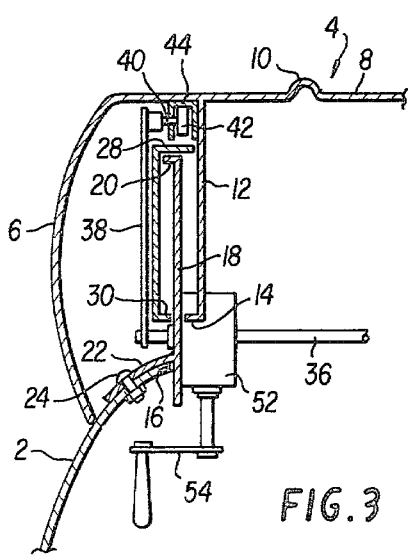
FIG. 3 is a fragmentary enlarged sectional view taken substantially along the line 3—3 of FIG. 1.

As can be seen from FIG. 3, when the vehicle top is in its lower position an outer shroud 6 extends downwardly into engagement with or in close proximity to the top portion of the vehicle itself, and thus encloses all of the internal mechanism. The upper section 4 comprises a generally horizontal roof panel 8 which may have longitudinal ribs 10 thereon for stiffening purposes.

Inwardly of the shroud 6, a depending wall 12 is formed on or attached to the roof panel 8 to extend downwardly therefrom, and is provided at its lower edge with an outwardly extending flange 14.

Figure 4:
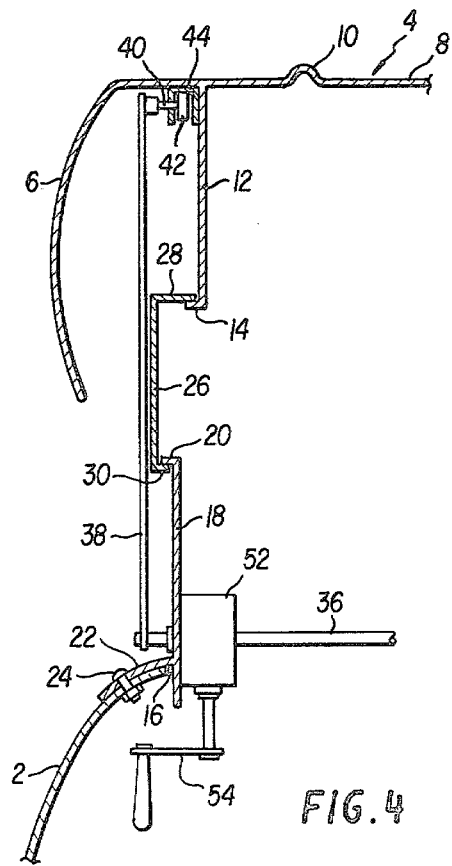
FIG. 4 is an enlarged fragmentary sectional view taken substantially on the line 4—4 of FIG. 2.

As seen in FIGS. 3 and 4, the top of the vehicle 2 has been cut away to provide an opening bounded by the edge indicated at 16. A lower section of applicant's extendable roof comprises an upstanding wall 18, extending downwardly within the opening 16 for a short distance and having an outwardly extending flange 20 at its upper edge. Also, as a part of the lower section, is an outwardly extending flange 22, which may be secured to the roof of the vehicle 2 by the user. The flange 22 extends over and rests on the peripheral portion of the opening 16 and may be secured thereto by bolts 24 or other suitable means. Thus, the invention may be installed by the user by first cutting the opening 16 in his vehicle roof, then installing the lower section as described.

As is evident from the drawings, the flange 14 of the depending wall 12 extends outwardly only substantially to the plane of the inner surface of the upstanding wall 18, so that the wall 12 and its flange 14 may telescope within the wall 18 when the parts are in the lower position, as clearly shown in FIG. 3.

An intermediate section comprises an upright wall 26, having inwardly directed flanges 28 and 30 at its upper and lower edges, respectively. The upper flange 28 extends inwardly sufficiently far to overlie the flange 14 on the depending wall 12 and to extend completely over the upper edge of the wall 18 when the parts are in the lower position of FIG. 3. The lower flange 30 of the wall 26 extends inwardly below flange 20 and substantially to the outer surface of wall 18 so that the latter may telescope within the intermediate section when the parts are lowered, as shown in FIG. 3.

As best seen in FIG. 2 wherein the roof is erected to the upper position, windows or the like 31 in the intermediate wall 26 are exposed to the outdoors, and thus provide light for the interior of the vehicle.

Figure 5:
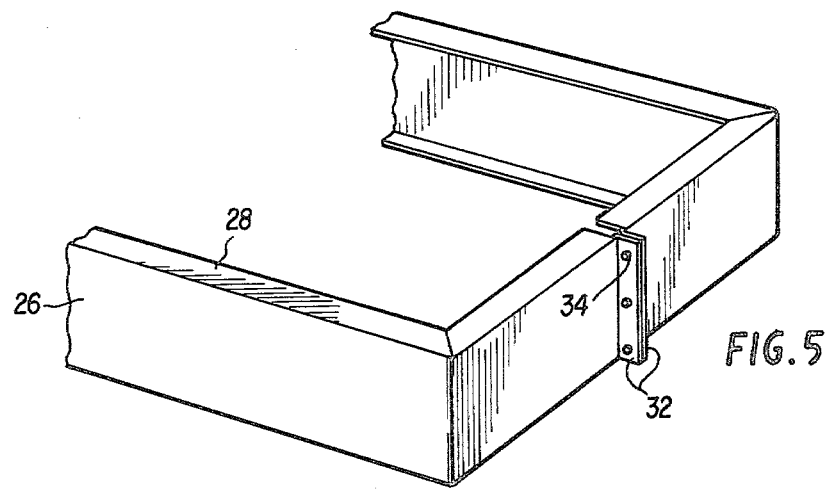
FIG. 5 is a fragmentary perspective view of a portion of the intermediate section of applicant's roof.

Referring now to FIG. 5, the intermediate section comprising the wall 26 and flanges 28 and 30 is preferably formed of sheet metal or similar material and one end of the intermediate section is split and the adjacent ends provided with outwardly extending flanges 32. The flanges may be bolted or otherwise secured to each other by suitable fasteners 34 and it will be apparent that with the fasteners 34 removed, the sidewall 26 may be spread apart to enlarge its inner area and thus enable it to be installed over the flanges 14 and 20 of the upper and lower sections, respectively. In like manner, the fasteners 34 may be removed to dismantle the apparatus if and when desired.

Figure 6:
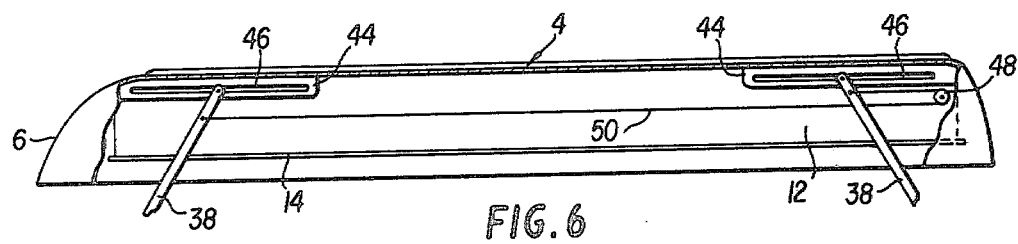
FIG. 6 is a schematic view illustrating the arrangement and operation of the elevating links.
Figure 7:
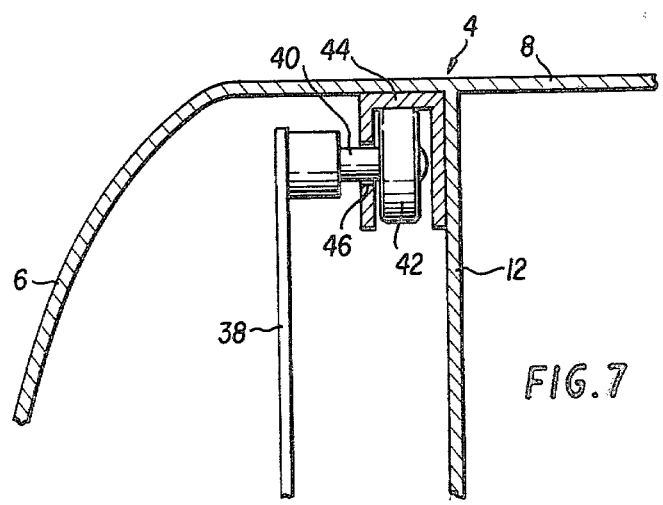
FIG. 7 is an enlarged and fragmentary transverse sectional view of the trackway for guiding the upper ends of the elevating links of the invention.

Adjacent opposite ends of the vehicle transverse shafts 36 (FIGS. 2 and 4) are journalled in the lower section and extend outwardly through wall 18 on both sides of the vehicle. Each shaft 36 has a link 38 attached to each outer end in fixed relation so that the links are nonrotatable thereon. The links 38 extend upwardly to the upper section, and outwardly of all of the telescoping sections described. At its upper end, each link 38 is provided with a stub shaft 40 extending inwardly and on which a guide roller 42 is journalled. This structure is shown in greater detail in FIG. 7 wherein a trackway defined by a channel shaped member 44 is provided. The channel 44 is fixed to the upper section, outwardly of the depending wall 12 and is provided with a longitudinal slot 46, extending a substantial distance therealong. As shown, the stub shaft 40 extends through the slot 46 and the roller 42 rolls along the bottom of channel 44. Referring now to FIG. 6, the links 38 are shown in a position which they assume during partial erection of the roof or partial lowering thereof, and the figure shows the general extent of each of the channel trackways 44. As also shown in FIG. 6, a pulley 48 is journalled on the side of the wall 12 adjacent the end of one of the channels 44 and a cable or the like 50 is secured at one end to the link 38 at one end of the vehicle, and is trained over the pulley 48 then extends to and is secured to the link 38 on the same side of the vehicle at the other end thereof. Thus, when the link at one end of the vehicle is swung upwardly, for example, the link 38 shown at the right side of FIG. 6, it releases the cable 50 so that link 38 can also be swung upwardly. It is contemplated that a similar arrangement of pulley and cable be provided on the other side of the vehicle but with the pulley 48 at the other end of the roof.

As previously indicated, each shaft 36 has a link 38 on each side of the vehicle and rigidly attached to the shaft. One of the shafts 36, for example, the forward shaft (the one shown at the left side of FIG. 6) may be provided with a drive means generally indicated at 52 in FIG. 4. The drive means may comprise a suitable gearing and hand crank 4 whereby the operator may manually rotate the shaft 36 to forcibly swing the links 38 upwardly or downwardly to thus either raise or lower the extendable roof. Clearly, however, the manually operable drive means could be replaced by suitable electrically driven means, if desired.

It is also to be noted that when the roof parts are in the position of FIG. 2, the links 38 extend substantially vertically so they are placed directly in compression by the weight of the upper section 4, and there is no tendency for the links to swing downwardly. Thus the extended vehicle top is in a stable position.

With the parts in the relative positions shown in FIG. 3, it is to be noted that the wall 12 and its flange 14 are telescoped downwardy within the lower wall 18 and the intermediate wall 26 is telescoped over the outside of the wall 18. In this position, the shroud 6 extends downwardly to house and protect all moving parts of the mechanism. When the drive mechanism is operated to extend the roof upwardly, the upper section comprising the panel 8 and the depending wall 12 are first lifted until the flange 14 on wall 12 engages the flange 28 on intermediate section 26. Continued upward movement of the upper section then lifts the intermediate section 26 until its lower flange 30 engages the underside of the flange 20 on wall 18 and thus the upward movement of the upper section is limited to the position shown in FIG. 4. At this time, the links 38 will have reached the vertical position shown in FIG. 2, and the upper section will be stably supported in its upper position with the side walls of the extended roof being rigid and in tight engagement with each other. In this condition, the shroud 6 serves as an eave or protective member for the trackway guiding the upper ends of the links 38 and the joint between the flanges 28 and 14.

From the foregoing description, it will be apparent that applicant has provided a novel and efficient extendable roof for a vehicle, and one that may be readily installed by the user, requiring no special tools, and which provides an extension roof that may be left up while travelling, since the side walls are all substantially rigid and of solid material whereby they are impervious to weather or air pressure during travel.

As also apparent from FIGS. 1 and 2, the shroud 6 depends generally in a vertical direction on all sides of the vehicle, but is configured, at the front of the vehicle (the left side of FIGS. 1 and 2 being the front of the vehicle), so as to effect a streamlined outline for the forward portion of the vehicle to minimize air resistance during forward travel.

While a single specific embodiment of the invention has been shown and described herein, the same is merely illustrative of the principles involved and changes in structure of some of the parts may be resorted to within the scope of the appended claims.

What is claimed is:

1. An extendable roof for a vehicle having an open top, comprising:

an upper, an intermediate and a lower section, said sections being telescopically related;

said upper section having a generally horizontal roof panel and a depending circumferential wall provided at its lower edge with an outwardly directed flange;

said lower section being an upstanding wall secured to said vehicle and extending around the periphery of the open top of said vehicle and having an outwardly extending flange at its upper edge, said lower section being dimensioned to telescopically receive said depending wall and flange of said upper section;

said intermediate section being an upright wall extending circumferentially around and outside both said walls of said upper and lower sections and having an inwardly extending flange at each of its upper and lower edges, its upper flange extending inwardly over said lower section and past the inner surface of the upstanding wall of said lower section in position to be engaged by the upper surface of the outwardly directed flange of said depending wall and its lower flange extending inwardly substantially to the outer surface of said upstanding wall and below the flange thereon.

2. An extendable roof as defined in claim 1 including a depending shroud around the periphery of said roof panel and spaced outwardly of said depending wall sufficiently to receive said intermediate and lower sections therebetween, said depending shroud being of sufficient vertical dimension to substantially engage the roof of said vehicle, outwardly of the open top thereof when said upper section is in its lowermost position.

3. An extendable roof as defined in claim 1 wherein said upstanding wall has a lower portion extending downwardly within the opening of said open top and has an outwardly directed supporting flange resting on and secured to the roof of said vehicle around the periphery of said opening.

4. An extendable roof as defined in claim 1 wherein said intermediate section is discontinuous, having adjacent end portions releasably secured together to permit flexing said end portions away from each other and thereby enlarging the lateral dimensions of said intermediate section for installing the same about or removing it from said upper and lower sections.

5. An extendable roof as defined in claim 4 wherein said depending wall, said upstanding wall and said upright wall are of substantially rigid material, at least said upstanding wall being resiliently bendable.

6. An extendable roof as defined in claim 1 including selectively operable means for lifting or lowering said upper section relative to said lower section.

7. An extendable roof as defined in claim 6 wherein said selectively operable means comprises links pivoted at one end to said lower section about fixed transverse axes; fore-and-aft track means on said upper section; the other ends of said links being guided along said track means.

8. An extendable roof as defined in claim 7 wherein the said links extend substantially vertically when said upper section is in its uppermost position.

9. An extendable roof as defined in claim 7 wherein there is a pair of said links at each end of said roof, there being one link of each pair on each side and both links of each pair being interconnected for simultaneous pivotal movement about one of said axes.

10. An extendable roof as defined in claim 9 including a pulley journalled on said depending wall on each side of said roof adjacent one pair of links, and a cable or the like secured to at least a link of said adjacent pair and extending therefrom around said pulley then to the corresponding link of the other pair.

11. An extendable roof as defined in claim 9 wherein said links of each pair are interconnected for simultaneous pivotal movement by being fixedly secured to the ends of a transverse shaft journalled in said lower section.

* * * * *